United States Patent [19]

Kishi et al.

[11] Patent Number: 4,706,200
[45] Date of Patent: Nov. 10, 1987

[54] AREA CUTTING METHOD

[75] Inventors: Hajimu Kishi; Masaki Seki; Takashi Takegahara, all of Tokyo, Japan

[73] Assignee: Fanuc Ltd., Minamitsura, Japan

[21] Appl. No.: 768,118

[22] PCT Filed: Dec. 14, 1984

[86] PCT No.: PCT/JP84/00592
§ 371 Date: Aug. 13, 1985
§ 102(e) Date: Aug. 13, 1985

[87] PCT Pub. No.: WO85/02572
PCT Pub. Date: Jun. 20, 1985

[30] Foreign Application Priority Data

Dec. 14, 1983 [JP] Japan ................................. 58-235461

[51] Int. Cl.$^4$ .................... G06F 15/46; G05B 19/18
[52] U.S. Cl. .................................... 364/474; 364/170; 318/572
[58] Field of Search ............... 364/474, 475, 167–171; 318/572

[56] References Cited

U.S. PATENT DOCUMENTS

3,866,179  2/1975  McGee et al. .................. 364/170 X
4,162,527  7/1979  Kilbane et al. ................. 364/170 X
4,503,493  3/1985  Burkhardt et al. .................. 364/170

Primary Examiner—Joseph Ruggiero
Attorney, Agent, or Firm—Staas & Halsey

[57] ABSTRACT

The present invention relates to an area cutting method for cutting an area (AR) delimited by a curve (OLC) of an external shape and at least two closed curves ($INC_1$, $INC_2$) which lie within the curve of the external shape. The area cutting method has a step of calculating first and second offset curves ($INF_1$, $INF_2$) offset outwardly from the respective closed curves ($INC_1$, $INC_2$) by an amount dependent upon tool diameter, a step of checking whether the offset curves intersect each other, a step of ascertaining that an overlap portion (CSA) incapable of being area-cut exists when the offset curves intersect each other, and a step of cutting only an area from which the portion (CSA) incapable of being area-cut is omitted when the overlap portion exists.

1 Claim, 16 Drawing Figures

AREA CUTTING METHOD

CROSS REFERENCE TO RELATED APPLICATIONS

This application is related to U.S. application Ser. Nos. 767,797; 767,265; and 776,205.

BACKGROUND OF THE INVENTION

1. Field of the Invention

This invention relates to an area cutting method in a numerically controlled machine tool and, more particularly, to an area cutting method for cutting an area delimited by a curve of an external shape and at least two closed curves which lie within the curve of the external shape.

2. Description of the Related Art

Forms of numerically controlled machining include cutting in which the interior of an area bounded by the curve of an external shape comprising straight lines and circular arcs is hollowed out down to a predetermined depth, and die milling in which the interior of an area is die milled. In such machining, as shown in FIG. 1(A), an area cutting method is conventionally carried out by performing cutting along an (i−1)th cutting path $PT_{i-1}$ in one direction (the direction of the solid-line arrow), raising the tool a predetermined amount at the completion of cutting, then positioning the tool directly above a cutting starting point Ps on the next, or i-th, cutting path $PT_i$ by moving the tool in the direction of the dashed-line arrow, thereafter lowering the tool to the cutting starting point Ps, moving the tool along the i-th cutting path $PT_i$ in the direction of the solid line arrow, and subsequently repeating the above unidirectional cutting.

Figure 1A:
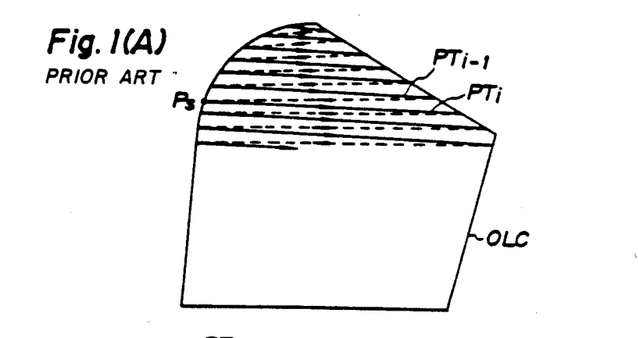
FIGS. 1(A) and 1(B) are views for describing conventional area cutting methods using unidirectional and back-and-forth cutting.
Figure 1B:
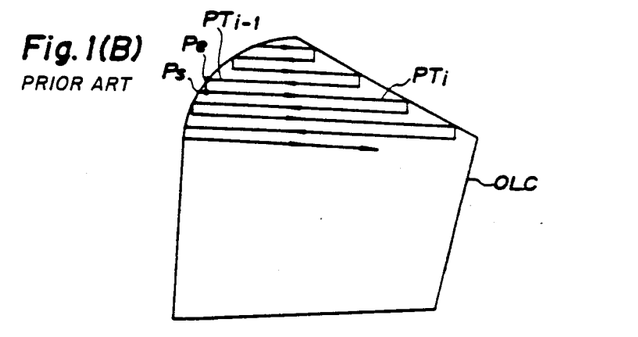

Another area cutting method shown in FIG. 1(B) includes, following completion of cutting along the cutting path $PT_{i-1}$ of the (i−1)th cutting path, moving the tool from a cutting end point $P_e$ to the cutting starting point Ps on the next, or i-th, cutting path, and thereafter performing cutting along the i-th cutting path PTi. Thus, cutting is performed back and forth in the direction of the solid-line arrows.

Figures 2, 3:
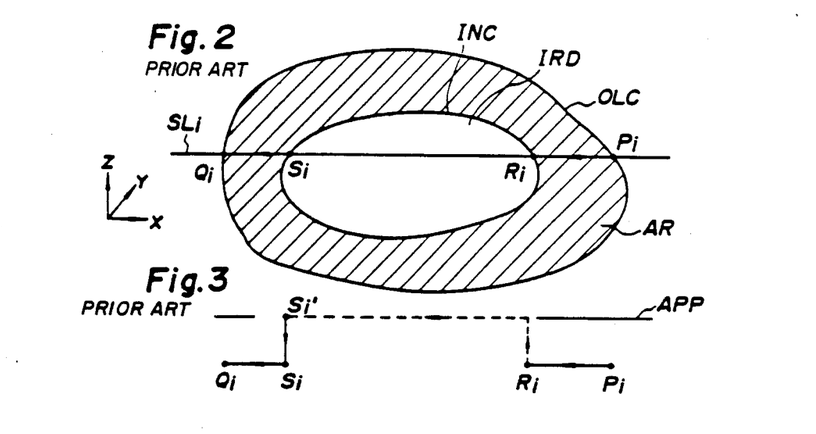
FIGS. 2 and 3 are views for describing a conventional cutting method for a case where an island is present.

There are cases where it is required to cut an area AR (shaded portion) delimited by a curve OLC of an external shape and a closed curve INC inside the curve of the external shape, as shown in FIG. 2. The reason is that it is necessary to form bolt holes, which are needed for effecting a connection to another part, in the area (hereafter referred to as an "island") IRD bounded by the closed curve INC, or to hollow out the island IRD to a depth less than that of the area AR by using a different tool.

Thus, if the island IRD is present inside the curve of the external shape, the area AR (the shaded portion in FIG. 2) delimited by the shape OLC of the external curve and the closed curve INC is cut, in accordance with the conventional method shown in FIG. 1(A) or 1(B), by (a) obtaining intersection points $P_i$, $Q_i$ between a straight line $SL_i$ and the curve OLC (actually an offset curve) of the external shape, and obtaining intersection points $R_i$, $S_i$ between the straight line $SL_i$ and the closed curve INC (actually an offset curve), (b) then moving the tool in a cutting-feed mode from the point $P_i$ to the point $R_i$ after positioning the tool at the point $P_i$, which is a cutting starting point, (c) raising the tool along the +Z axis up to an approach plane APP (FIG. 3) after the tool arrives at the point $R_i$, (d) moving the tool in a rapid-traverse mode on the approach plane, after the tool has arrived at the approach plane, to a point $S_i'$ directly above the point $S_i$, (e) then lowering the tool in the cutting-feed mode to the point $S_i$, (f) thereafter moving the tool in the cutting-feed mode from the point $S_i$ to the point $Q_i$, and (g) subsequently repeating steps (a) through (f) for the next cutting path.

Figure 4:
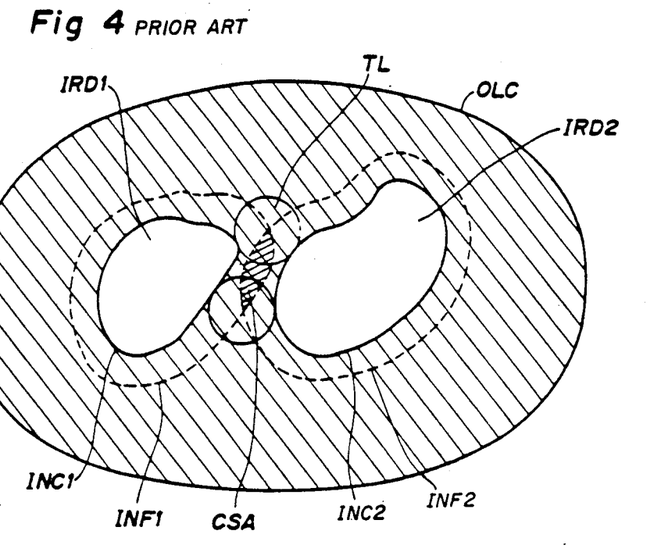
FIG. 4 is a view for describing the drawbacks of the conventional area cutting methods.

Area cutting can thus be carried out with the conventional methods even if the island IRD is present. However, the conventional methods cannot be applied as they are if two or more islands are present and the spacing between the islands is small. By way of example, the conventional methods cannot be applied if, as shown in FIG. 4, two islands $IRD_1$, $IRD_2$ reside so close together inside the curve OLC of the external shape that offset curves $INF_1$, $INF_2$ intersect, the latter curves being obtained by offsetting closed curves $INC_1$, $INC_2$, which specify the respective islands, by a predetermined amount D (e.g., a value obtained by adding tool radius $r_a$ and finishing tolerance t). If the conventional methods are forced into use in this case, the tool TL will unfortunately cut into either island $IRD_1$ or island $IRD_2$ in the vicinity of the intersection CSA.

SUMMARY OF THE INVENTION

An object of the present invention is to provide an area cutting method whereby area cutting can be performed even if two or more islands reside so close together inside the curve OLC of the external shape that the offset curves $INF_1$, $INF_2$ of the closed curves $INC_1$, $INC_2$ specifying the islands intersect each other.

Another object of the present invention is to provide an area cutting method wherein, when two offset curves $INF_1$, $INF_2$ intersect each other, these are combined to obtain a combined offset curve consisting of a single closed curve and area cutting is performed so that the center of the tool does not penetrate the interior of the offset curve.

Still another object of the present invention is to provide an area cutting method wherein, when two offset curves intersect each other to give rise to a portion which is impossible to area-cut, cutting of this portion is omitted and only the remaining area-cuttable portions are area-cut.

A further object of the present invention is to provide an area cutting method whereby the curve of an external shape, each closed curve inside the curve of the external shape and offset curves are displayed on a display unit.

The present invention relates to an area cutting method for cutting an area delimited by a curve of an external shape and at least two closed curves which lie within the curve of the external shape. The area cutting method has a step of calculating first and second offset curves offset outwardly from the respective closed curves by an amount dependent upon tool diameter, a step of checking whether the offset curves intersect each other, a step of ascertaining that an overlap portion incapable of being area-cut exists when the offset curves intersect each other, and a step of cutting only an area from which the portion incapable of being area-cut is omitted when such an overlap portion exists.

DESCRIPTION OF THE PREFERRED EMBODIMENTS

Figure 5:
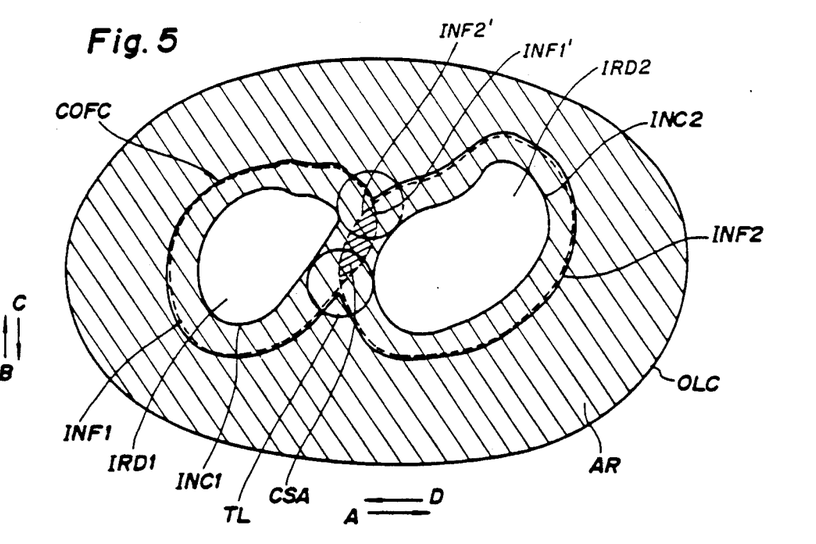
FIG. 5 is a view for describing the present invention in general terms.

FIG. 5 is a view for describing the present invention in general terms. The present invention provides an area cutting method for cutting an area AR delimited by a curve OFC of an external shape and at least two closed curves $INC_1$, $INC_2$ which lie within the curve of the external shape. The area cutting method has a step of calculating first and second offset curves $INF_1$, $INF_2$ offset outwardly from the respective closed curves by an amount dependent upon tool diameter, a step of checking to determine whether the offset curves intersect each other, and a step of cutting an area from which there has been omitted an area CSA common to both an area bounded by the first offset curve $INF_1$ and an area bounded by the second offset curve $INF_2$ when the offset curves intersect each other.

Figure 6:
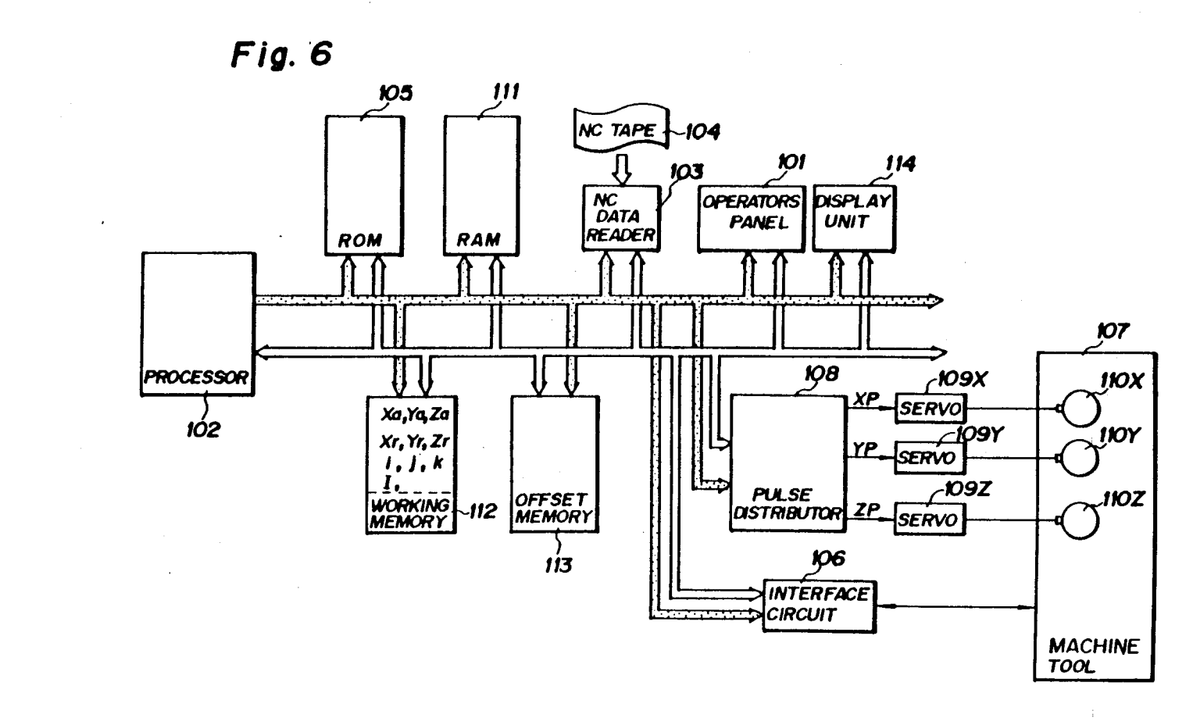
FIG. 6 is a block diagram of an apparatus for practicing the area cutting method of the present invention.
Figure 7A:
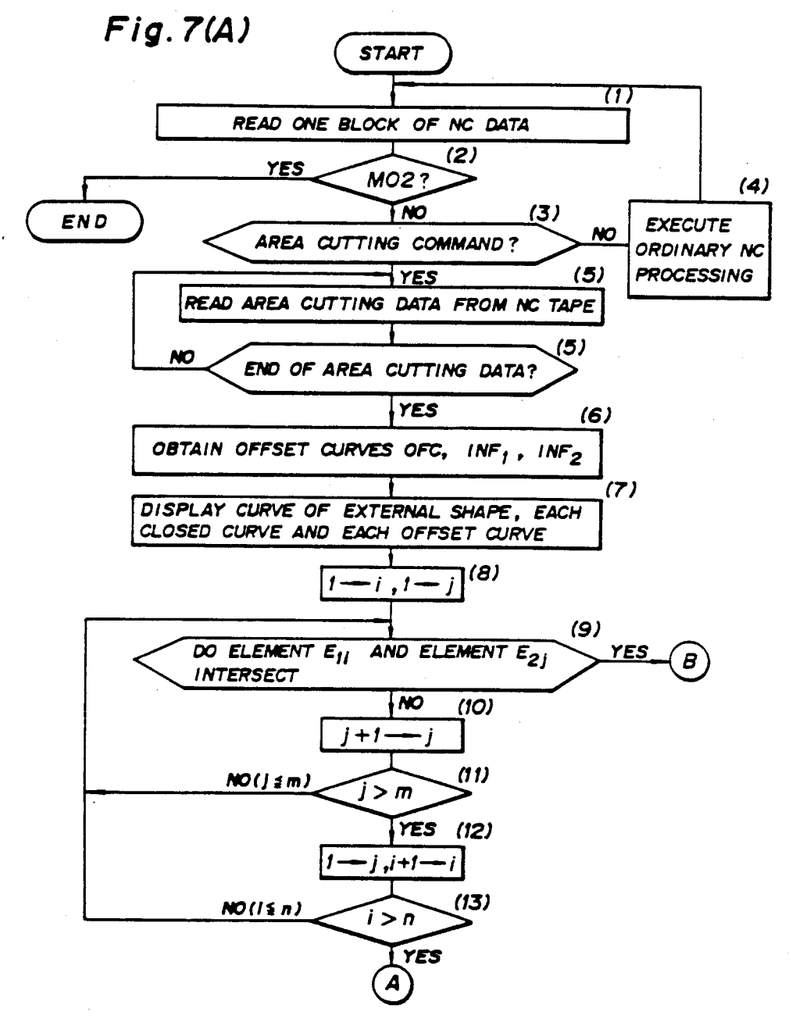
FIGS. 7A–7C comprise a flowchart of processing for implementing the area cutting method of the present invention.
Figure 7B:
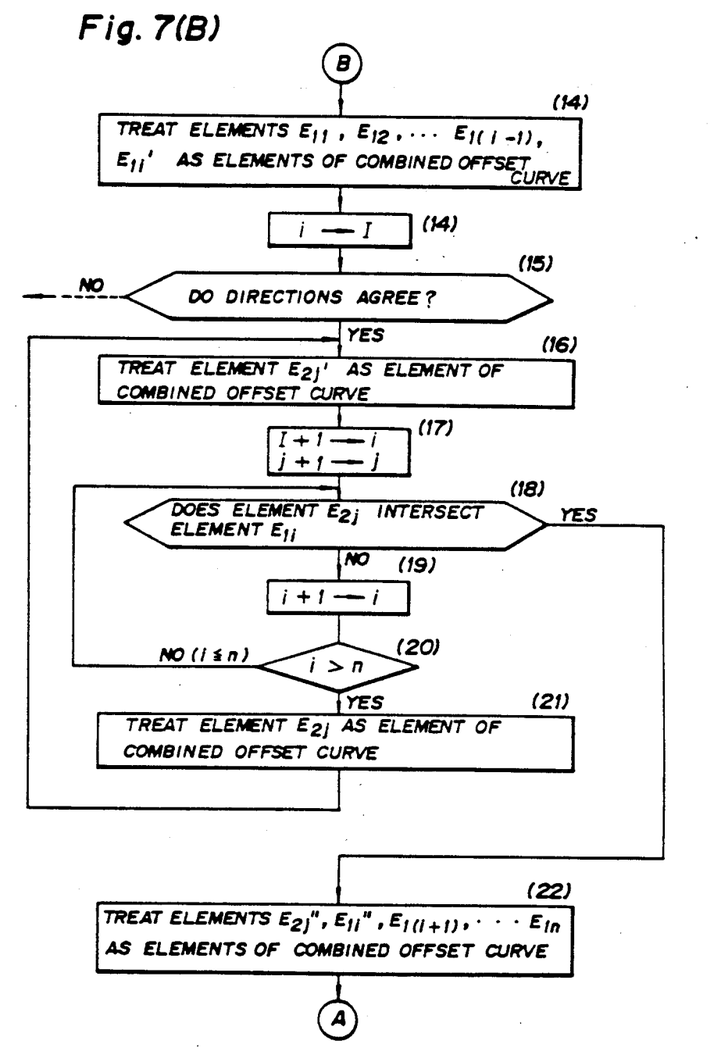
Figure 7C:
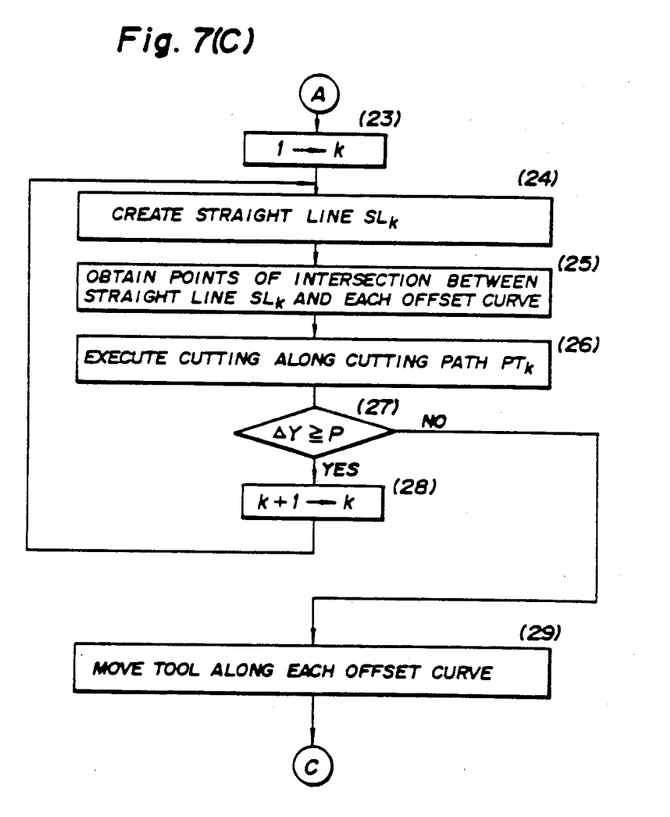

FIG. 6 is a block diagram of an apparatus for practicing the method of the present invention, and FIG. 7 is a flowchart of processing according to the present invention. The area cutting method of the present invention will now be described with respect to FIGS. 5, 6 and 7.

(1) When a cycle start button on an operator's panel 101 is pressed, a processor 102 causes an NC data reader 103 to read one block of NC data from an NC tape 104. The NC tape 104 stores area cutting data in addition to ordinary path data, G-function instruction data and M-, S- and T-function instruction data. Stored at the end of the NC program is an M code (M02) indicating the end of the program. Placed at the beginning of the area cutting data is an area cutting command indicating that the data which follow are the area cutting data. Placed at the end of the area cutting data is a code indicative of the end of the area cutting data.

(2) The processor 102, placed under the control of a control program stored in a ROM 105, checks whether an item of the read NC data is "M02", which is indicative of program end. If the item of data is "M02", numerical control processing is ended.

(3) If the item of read NC data is not "M02" indicative of the program end, then the processor 102 checks whether the item of NC data is the area machining command.

(4) If the item of NC data is not the area machining command, the processor 102 executes ordinary numerical control processing.

By way of example, if an item of NC data is an M-, S- or T-function instruction, the processor delivers the data to a machine tool 107 via an interface circuit 106 between an NC unit and the machine. When the machine tool 107 generates a completion signal indicating completion of processing for the M-, S- or T-function instruction, the processor causes the NC data reader 103 to read the next item of NC data.

If the item of NC data is path data, then the following path control processing is executed. Specifically, the processor obtains incremental values $X_i$, $Y_i$, $Z_i$ along the respective axes, obtains velocity components $F_x$, $F_y$, $F_z$ along the respective axes from equations $$F_x = X_i \cdot F / \sqrt{X_i^2 + Y_i^2 + Z_i^2} \quad (1a)$$

$$F_y = Y_i \cdot F / \sqrt{X_i^2 + Y_i^2 + Z_i^2} \quad (1b)$$

$$F_z = Z_i \cdot F / \sqrt{X_i^2 + Y_i^2 + Z_i^2} \quad (1c)$$

based on the incremental values and a commanded feed velocity F, thereafter obtains traveling quantities $\Delta X$, $\Delta Y$, $\Delta Z$, which are to be traversed along the respective axes in a predetermined period of time $\Delta T$ seconds ($=8$ msec), from equations $$\Delta X = F_x \cdot \Delta T \quad (2a)$$

$$\Delta Y = F_y \cdot \Delta T \quad (2b)$$

$$\Delta Z = F_z \cdot \Delta T \quad (2c)$$

The processor delivers $\Delta X$, $\Delta Y$, $\Delta Z$ to a pulse distributor 108 every $\Delta T$ sec. On the basis of the input data ($\Delta X$, $\Delta Y$, $\Delta Z$), the pulse distributor 108 performs a simultaneous three-axis pulse distribution calculation to generate distributed pulses $X_p$, $Y_p$, $Z_p$. The distributed pulses are applied as inputs to servo circuits 109X, 109Y, 109Z for the respective axes to rotate servomotors 110X, 110Y, 110Z. The tool is thus moved relative to the workpiece toward a target position.

The processor 102, in accordance with the following formulae, updates the present position $X_a$, $Y_a$, $Z_a$ along the respective axes every $\Delta T$ sec, $X_a$, $Y_a$, $Z_a$ having been stored in a working memory 112:

$$X_a \pm \Delta X \rightarrow X_a \quad (3a)$$

$$Y_a \pm \Delta Y \rightarrow Y_a \quad (3b)$$

$$Z_a \pm \Delta Z \rightarrow Z_a \quad (3c)$$

The sign depends upon the direction of movement. Similarly, in accordance with the following formulae, the processor 102 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the working memory 112:

$$X_r - \Delta X \rightarrow X_r \quad (4a)$$

$$Y_r - \Delta Y \rightarrow Y_r \quad (4b)$$

$$Z_r - \Delta Z \rightarrow Z_r \quad (4c)$$

When the following condition is established:

$$X_r = Y_r = Z_r = 0 \quad (5)$$

the processor 102 then causes the NC data reader 103 to read the next item of NC data.

(5) If the item of NC data is found to be the area cutting command at the decision step (3), the processor 102 causes the NC data reader 103 to read the area cutting data and store the data in a RAM 111 until the code indicating the end of the area cutting data is read out. It should be noted that the area cutting data are (1) data specifying the curve OLC of the external shape of the area, (2) data specifying the two closed curves $INC_1$, $INC_2$ inside the curve of the external shape, (3) cutting direction data (data indicating that the tool is to be moved in the direction of the arrow A or in the direction of an arrow D in FIG. 5), (4) cut-in direction data (data indicating that the cutting path is to be shifted in the direction of the arrow B or in the direction of an arrow C in FIG. 5), (5) pitch P in the cut-in direction (the amount of cutting path shift), (6) cutting velocity, (7) coordinate values of a starting point $P_s$ in the cut-in direction, (8) coordinate values of an end point $P_e$ in the cut-in direction, (9) the position of an approach plane, and the like. Hereafter we will assume that the cutting direction is the $+X$ direction, that the cut-in direction is the $+Y$ direction, that the approach plane is parallel to the XY plane at a height $Z_A$, that the coordinate values of the cut-in direction starting point $P_s$ are $(X_s, Y_s)$, and that the coordinate values of the cut-in direction end point $P_e$ are $(X_e, Y_e)$.

Figure 8:
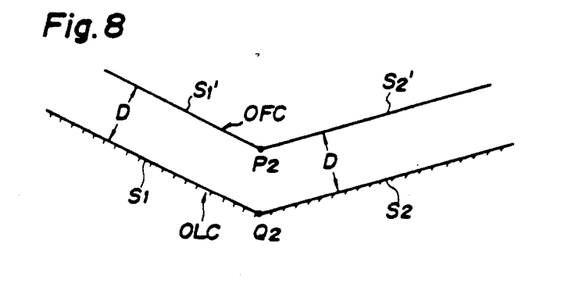
FIG. 8 is a view for describing offset processing.

(6) When the reading of the area cutting data ends, the processor 102 calculates, and stores in the RAM 111, an offset curve OFC of the external shape offset from the curve OLC of the external shape by a distance D $(=r_a+t)$, the latter being obtained by adding the tool radius $r_a$ and the finishing tolerance t, as well as the first and second offset curves $INF_1$, $INF_2$ offset outwardly from the closed curves $INC_1$, $INC_2$, respectively, by the distance D. It should be noted that $D=r_a$ is permissible. Also, the tool radius $r_a$ is obtained by reading a radius value corresponding to a commanded tool number from an offset memory 113, which stores the correspondence between tool numbers and tool radii. The offset curve OFC of the external shape and the first and second offset curves $INF_1$ $INf_1$, $INF_2$ are found through the following processing. Specifically, as shown in FIG. 8, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC of the external shape. Accordingly, if points of intersection are found in a similar manner and stored in the RAM 111, the offset curve OFC of the external shape will be obtained. The first and second offset curves $INF_1$, $INF_2$ are found in a similar manner.

(7) When the offset curve OFC of the external shape and the first and second offset curves $INF_1$, $INF_2$ have been found, the processor 102 causes the offset curve data to be displayed on a display unit 114 together with data specifying the curve OLC of the external shape and data specifying the closed curves $INC_1$, $INC_2$. As a result, the curve OLC of the external shape and the closed curves $INC_1$, $INC_2$ are displayed in the form of solid lines, as well as the offset curves in the form of dashed lines, on a CRT screen by a well-known method. By observing the display, an operator is capable of perceiving that a portion which cannot be area-cut exists, this being the case if the offset curves indicated by the dashed lines intersect each other. The operator also perceives that a shape actually cut by subsequent processing may differ slightly from the desired shape.

(8) Next, the processor 102 performs an internal check to determine whether the offset curve $INF_1$ and offset curve $INF_2$ intersect.

Figure 9:
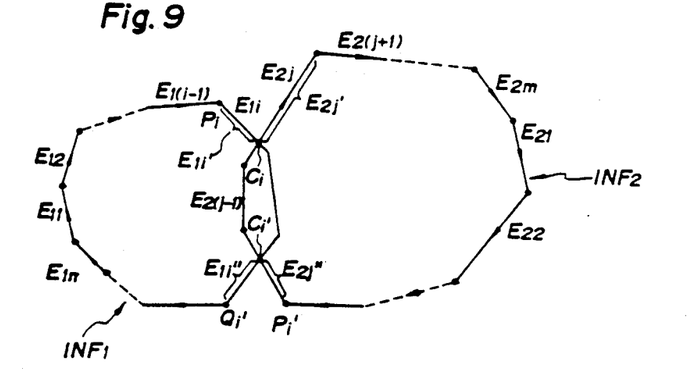
FIG. 9 is a view for describing processing for creating a combined offset curve.

The offset curves $INF_1$, $INF_2$ are both composed of a number of straight lines and circular arcs (straight lines and circular arcs will hereafter be referred to as elements). More specifically, as shown in FIG. 9, the offset curve $INF_1$ consists of elements $E_{11}$, $E_{12}$, ... $E_{1n}$, and the offset curve $INF_2$ consists of elements $E_{21}$, $E_{22}$, $E_{23}$, ... $E_{2m}$. Accordingly, the processor 102 first performs the operations $1 \to i$, $1 \to j$.

(9) Next, the processor determines whether the i-th element $E_{1i}$ of the offset curve $INF_1$ intersects the j-th element $E_{2j}$ of the offset curve $INF_2$.

(10) If the elements do not intersect, the operation $j+1 \to j$ is performed.

(11) Next, j and the number m of elements constituting the offset curve $INF_2$ are compared in terms of magnitude and processing from step (9) onward is repeated if $j \leq m$ is true.

(12) If $j > m$ is true in the comparison of step (10), the operations $1 \to j$, $i+1 \to i$ are performed and i is compared in terms of magnitude with the number n of elements constituting the offset curve INF.

(13) If $i \leq n$ is true, processing from step (9) onward is repeated.

If $i > n$ is attained without an intersection occurring, the processor 102 renders a decision to the effect that the offset curves $INF_1$, $INF_2$ do not intersect.

(14) On the other hand, if an element $E_{1i}$ intersects an element $E_{2j}$ at step (9), the processor 102 decides that the offset curves $INF_1$, $INF_2$ intersect and then executes processing for creating a combined offset curve. Specifically, the processor 102 treats elements $E_{11}$, $E_{12}$, ..., $E_{1(i-1)}$ as elements of a combined offset curve and stores them in the RAM 111. The processor also treats a portion $E_{1i}'$ from the starting point $P_i$ of the element $E_{1i}$ to the intersection point $C_i$ (see FIG. 9) as an element of the combined offset curve, stores this portion in the RAM 111, and performs the operation $i \to I$.

(15) Next, the processor 102 determines whether the directions traveled in traversing elements $E_{11}$, $E_{12}$, ... $E_{1n}$ and elements $E_{21}$, $E_{22}$, ... $E_{2m}$ are clockwise or counter-clockwise. It should be noted that these position data are applied as area cutting data.

(16) If both directions are clockwise or counter-clockwise, the portion $E_{2j}'$ from intersection point $C_i$ to the end point $Q_j$ of element $E_{2j}$ is treated as an element on the combined offset curve and is stored in the RAM 111. If the directions differ, a combined offset curve can be created through processing which is almost the same as that from this point onward. The description thereof is therefore omitted.

(17) The processor then performs the operations $I+1 \to i$ and $j+1 \to j$.

(18) Thereafter, the processor 102 determines whether the element $E_{2j}$ of the offset curve $INF_2$ intersects the element $E_{1i}$ of the offset curve $INF_1$.

(19) The operation $i+1 \to i$ is performed if the elements do not intersect.

(20) Next, i and n are compared in terms of magnitude. If $i \leq n$ is true, processing from step (18) onward is repeated.

(21) If $i > n$ is true in the comparison of step (20), then the processor 102 treats the element $E_{2j}$ as being an element on the combined offset curve and stores it in the RAM 111.

The operations $I+1 \rightarrow i$ and $j+1 \rightarrow j$ are performed and processing from step (16) onward is repeated. Note that when $j > m$ holds, the operation $1 \rightarrow j$ is performed.

(22) If the element $E_{2j}$ is found to intersect the element $E_{1i}$ in the decision step (18), then the processor 102 treats a portion $E_{2j}''$ from the starting point $P_i'$ of the element $E_{2j}$ to an intersection point $C_i'$, a portion $E_{1i}''$ from the intersection point $C_i'$ to the end point $Q_i'$ of the element $E_{1i}$, and all elements from the element $E_{1(i+1)}$ to the element E1n as elements of the combined offset curve. The processor stores these portions in the RAM 111, thus ending processing for creating a combined offset curve COFC. It should be noted that if the directions traveled in traversing the constituent elements of the offset curves $INF_1$, $INF_2$ differ, the direction discrimination process of step (15) can be dispensed with if the constituent elements of one offset curve are arranged in reverse order beforehand to give them the same direction as the other offset curve.

Thus, by way of the foregoing processing, there is created a combined offset curve COFC from which there are excluded first and second offset curve portions $INF_1'$, $INF_2'$ forming the area CSA common to both the area bounded by the first offset curve $INF_1$ and the area bounded by the second offset curve $INF_2$. Thereafter, area cutting from a step (23) onward is carried out. It should be noted that if the offset curves $INF_1$, $INF_2$ do not intersect [i.e., if $i > n$ is found to hold at step (13)], a portion incapable of being area-cut does not exist. Instead of obtaining a combined offset curve, therefore, the processor 102 performs area cutting based on unidirectional cutting or back-and-forth cutting through the processing from step (23) onward. Let us assume that area cutting is performed by unidirectional processing hereinafter.

(23) The processor 102 performs the operation $1 \rightarrow k$ first.

Figure 10:
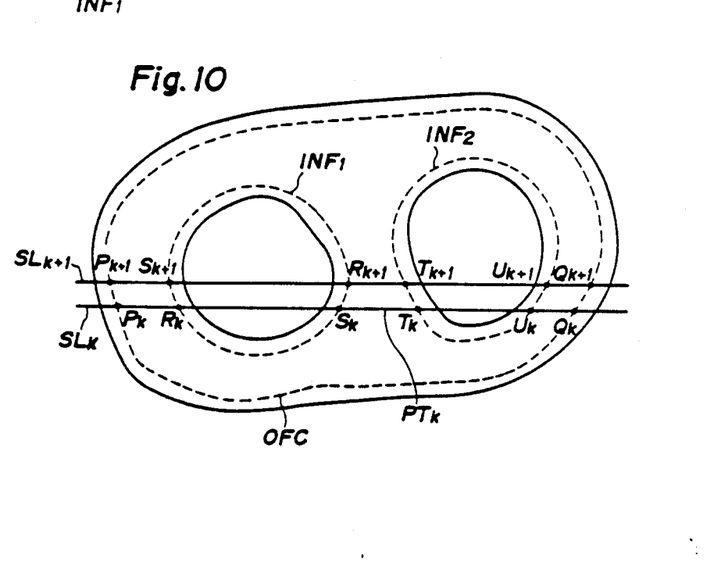
FIG. 10 is a view for describing a cutting method for a case where, a portion incapable of being area-cut does not exist.

(24) Next, the processor 102 executes processing for specifying a k-th cutting path $PT_k$ (see FIG. 10). Specifically, the processor 102 first generates a straight line $SL_k$. Note that the straight line $SL_k$ is expressed by the equation $$y = Y_s + P \cdot k$$

(25) Thereafter, the processor 102 calculates intersection points $P_k$, $Q_k$ where the straight line $SL_k$ intersects the offset curve OFC, and obtains intersection points $R_k$, $S_k$ and $T_k$, $U_k$ between the straight line $SL_k$ and offset curves $INF_1$, $INF_2$, respectively. Of the intersection points $P_k$, $Q_k$, that which has the larger X coordinate value is treated as the machining starting point, and that which has the smaller X coordinate value is treated as the machining end point.

(26-1) If the intersection points $R_k$, $T_k$ do not exist (in which case the intersection points $S_k$, $U_k$ also will be non-existent as a matter of course), the processor 102 executes processing similar to that of step (4) to move the tool in the cutting-feed mode from the machining starting point $P_k$ to the machining end point $Q_k$, thereby performing cutting along the k-th cutting path $PT_k$.

(26-2) If only one of the intersection points $R_k$, $T_k$ exists (we shall assume that only the point $R_k$ exists), the processor moves the tool in the cutting-feed mode from the machining starting point $P_k$ to the point $R_k$, raises the tool along the $+Z$ axis in the rapid-traverse mode up to the approach plane after the tool arrives at the point $R_k$, moves the tool on the approach plane in the rapid-traverse mode to a point directly above the point $S_k$ after the tool arrives at the approach plane, then moves the tool in the cutting-feed mode to the point $S_k$, and thereafter moves the tool in the cutting-feed mode from the point $S_k$ to the machining end point $Q_k$ to perform cutting along the k-th cutting path $PT_k$.

(26-3) If both of the intersection points $R_k$, $T_k$ exist, the tool is not moved from point $S_k$ to the machining end point $Q_k$ in step (26-1) but is moved from $S_k$ to intersection point $T_k$ in the cutting-feed mode. After the tool arrives at the point $T_k$, the tool is raised along the $+Z$ axis in the rapid-traverse mode up to the approach plane, moved on the approach plane in the rapid-traverse mode to a point directly above the point $U_k$ after it arrives at the approach plane, moved in the cutting-feed mode to the point $U_k$, and thereafter moved in the cutting-feed mode from the point $U_k$ to the machining end point $Q_k$ to perform cutting along the k-th cutting path $PT_k$.

(27) When machining along the cutting path PTk ends, the processor 102 obtains the difference $_\Delta Y$ ($= Y_e' - Y_a$) between the present position coordinate (stored in the working memory 112) $Y_a$ along the Y axis and the Y-axis coordinate $Y_e'$ of the cut-in direction end point $P_e$ and determines whether or not the difference is greater than the pitch P.

(28) If $_\Delta Y \geq P$ is true, the processor 102 performs the operation $$k+1 \rightarrow k$$

and repeats the processing from step (24) onward.

(29) If $_\Delta Y < P$ is true, then the processor 102 moves the tool along the offset curves OFC, $INF_1$, $INF_2$ in the cutting-feed mode to machine the uncut portions, thereby ending area cutting. The processor subsequently reads the next item of NC data and repeats the foregoing processing.

In a case where the offset curves $INF_1$, $INF_2$ intersect, area cutting is performed through processing similar to that of steps (23) through (29) by obtaining the intersection points between the straight line $SL_k$ and the offset curve OFC and between the straight line $SL_k$ and the combined offset curve COFC, and carrying out cutting along the cutting path $PT_k$ by using the coordinate values of the points of intersection.

Figure 11A:
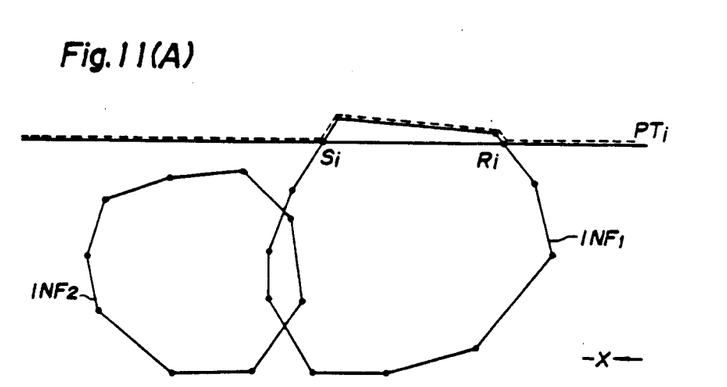
FIGS. 11A–11C comprise a view for describing another area cutting method according to the present invention.
Figure 11B:
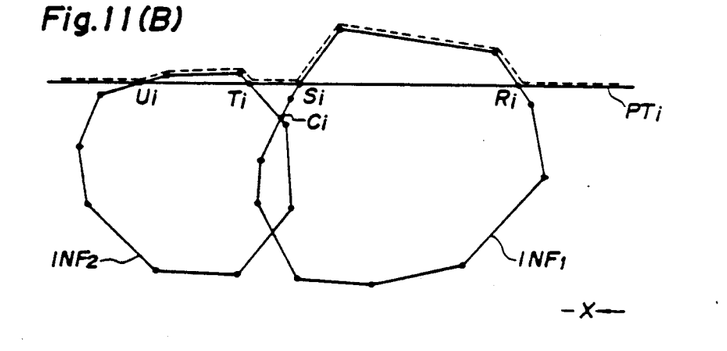
Figure 11C:
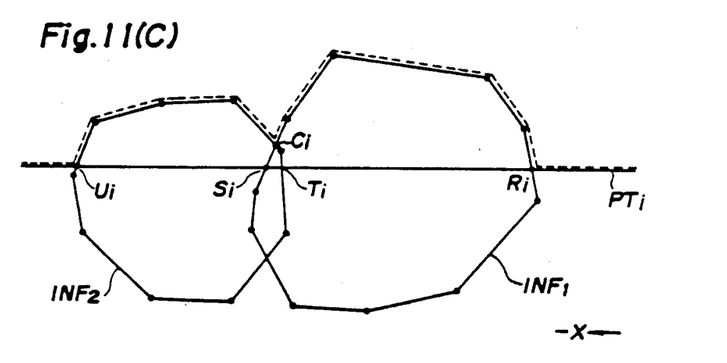

In the foregoing, area cutting is performed by checking in advance whether offset curves, which are offset outwardly from two respective closed curves inside a curve of an external shape, intersect each other, obtaining a combined offset curve in the case of intersection, and using the combined offset curve. However, area cutting can be carried out without obtaining a combined offset curve. FIG. 11 is a view for describing another area cutting method for a case where a portion incapable of being machined exists. FIG. 11(A) is for a case where the i-th cutting path $PT_i$ intersects solely the offset curve $INF_1$ of the first closed curve, and FIGS. 11(B) and 11(C) are for cases where the i-th cutting path $PT_i$ intersects the offset curves $INF_1$, $INF_2$ of the first and second closed curves, in which FIG. 11(B) shows an instance where the points of intersection between the i-th cutting path $PT_i$ and one of the offset curves lie outside the other offset curve, and 11(C) shows an instance where, of the two points of intersection between the i-th cutting path $PT_i$ and one of the offset curves, one of the intersection points lies inside the other offset curve. In FIG. 11, note that the tool moves in the $-X$ direction along the the dashed line. Processing executed by the processor will now be described in general terms.

(1) Among the points of intersection between the i-th cutting path $PT_i$ and each of the offset curves, the processor obtains the point of intersection first reached by the tool, which is $R_i$, and moves the tool to the intersection point $R_i$ in the cutting-feed mode. It should be noted that if a point of intersection does not exist, machining is performed by moving the tool in the cutting-feed mode from the machining starting point to the machining end point of the i-th cutting path.

(2) After the tool arrives at the point of intersection $R_i$, the processor moves the tool in the counter-clockwise direction from point $R_i$ along each element constituting the offset curve (offset curve $INF_1$ in the embodiment of FIG. 11) that contains the intersection point $R_i$. Path processing takes place as described hereinbelow, in which we will assume that the element containing the point $R_i$ is the first element, and that the successive elements in the counter-clockwise direction are the second element, third element... and so on in the order mentioned.

(a) It is determined whether the j-th element of the first offset curve $INF_1$ intersects the i-th cutting path $PT_i$ or the second offset curve $INF_2$.

(b) If the offset curve intersects neither, the tool is moved along the element, the operation $j+1 \rightarrow j$ is performed and similar processing is executed with respect to the next j-th element.

(c) If the j-th element intersects only the i-th cutting path $PT_i$ [see FIGS. 11(A), and 11(B)], then the tool is moved along j-th element to the intersection point $S_i$.

(d) If the j-th element intersects only the second offset curve [see FIG. 11(C)], then the tool is moved along j-th element to the intersection point $C_i$.

(e) If the j-th element intersects both the i-th cutting path $PT_i$ and the second offset curve $INF_2$, then the tool is moved rapidly along the j-th element to the earlier occurring intersection point.

(3) If the tool arrives at the i-th cutting path $PT_i$ before it reaches the second offset curve $INF_2$ [FIG. 11(B)], this is followed by obtaining an intersection point $T_i$ reached first by the tool among the intersection points between the i-th cutting path $PT_i$ and the second offset curve $INF_2$, moving the tool along the i-th cutting path to the point $T_i$, thereafter moving the tool in the counter-clockwise direction along the second offset curve to an intersection point $U_i$ in the above manner, and then moving the tool along the i-th cutting path to the machining end point after the tool arrives at the intersection point $U_i$. Note that if the i-th cutting path $PT_i$ does not intersect the second offset curve $INF_2$ [FIG. 11(A)], the tool is moved along the i-th cutting path from the point $S_i$ to the machining end point.

(4) If the tool arrives at the second offset curve $INF_2$ before it reaches the i-th cutting path $PT_i$ in being moved along the first offset curve $INF_1$, the tool is subsequently moved in the counter-clockwise direction along the element of the second offset curve that contains the intersection point $C_i$. In other words, it is checked whether the j-th element of the second offset curve $INF_2$ intersects the i-th cutting path. If it does not, the tool is moved along the j-th element, the operation $j+1 \rightarrow j$ is performed and it is checked whether the next j-th element intersects the i-th cutting path. If it does, the tool is moved along the j-th element to the intersection point $U_i$. Lastly, the tool is moved along the i-th cutting path to the machining end point. Note that the first element is the one that contains the intersection point $C_i$, and that the successive elements are the second element, third element... and so on, traversed by traveling counter-clockwise.

In FIG. 11, the tool is moved along the first and second offset curves in the cutting-feed mode. However, it is possible to have an arrangement in which the foregoing processing is executed while keeping the tool at rest and then move the tool in the rapid-traverse mode between $R_i$ and $S_i$ [FIGS. 11(A), (B)], between $T_i$ and $U_i$ [FIG. 11(B)], or between $R_i$ and $U_i$ [FIG. 11(C)].

Further, in the case described above, an area cutting command is inserted into the NC tape, cutting paths are successively created by using the area cutting data that follows the area cutting command, and area cutting is performed by moving the tool along the cutting paths. However, the invention is not limited to such a situation and an arrangement is possible in which an NC tape containing cutting path data is created by the above-mentioned method and area cutting is performed by using the NC tape containing this cutting path data.

According to the present invention as described above, if two or more islands lie so close together inside the curve of an external shape that the offset curves, which are obtained by offsetting closed curves specifying the respective islands by an amount dependent upon the tool diameter, intersect one another and therefore give rise to a portion incapable of being area machined, an area which omits this portion can be machined. Further, according to the present invention, two offset curves are combined to obtain a combined offset curve comprising a single closed curve, and to carry out area cutting without allowing the tool center to penetrate the interior of the combined offset curve. In other words, it is arranged so that if a portion incapable of being area-cut exists, this portion is not cut but the remaining portion that is capable of being area-cut is so cut. Therefore, a machine tool no longer ceases operating when area cutting becomes impossible, and erroneous cutting no longer takes place, as with the prior-art method. Moreover, according to the present invention, the offset paths are displayed on the display unit together with the islands and the curve of an external shape of an area. This allows the operator to readily perceive whether the offset curves intersect one another by observing the display and, hence, to readily ascertain whether an overlap portion incapable of being area-cut exists.

What is claimed is:

1. An area cutting determining method for determining an area for cutting delimited by a curve of an external shape and at least two closed curves which lie within said curve of the external shape, comprising the steps of:

producing offset curves outwardly from respective ones of said closed curves by an amount dependent upon tool diameter;

checking whether the offset curves intersect one another;

ascertaining that an overlap portion incapable of being area-cut exists when the offset curves intersect one another;

entering area cutting data necessary for performing area cutting based on unidirectional cutting or back-and-forth cutting including a cutting path shift direction and a shift amount;

producing a straight line, which specifies an i-th cutting path PTi, from the cutting path shift direction and the shift amount contained in said area cutting data;

obtaining points Pi, Qi at which said straight line intersects an offset curve obtained by inwardly offsetting the curve of the external shape, and point Ri, Si; Ti, Ui at which said straight line intersects each of said offset curves, respectively; and cutting an area from which said overlap position incapable of being area cut is omitted by:

moving the tool in a cutting-feed mode along the i-th cutting path from the machining starting point Pi to the intersection point Ri;

moving the tool in the cutting-feed mode along an offset curve containing said intersection point Ri;

moving the tool in the cutting-feed mode along the i-th cutting path after arrival thereat when the tool arrives at the i-th cutting path before arriving at a different offset curve;

moving the tool along the other offset curve after arrival thereat when the tool arrives at a different moving the tool along the i-th cutting path to the machining end point Qi.

* * * * *

UNITED STATES PATENT AND TRADEMARK OFFICE
CERTIFICATE OF CORRECTION

PATENT NO. : 4,706,200
DATED : November 10, 1987
INVENTOR(S) : Hajimi Kishi et al It is certified that error appears in the above-identified patent and that said Letters Patent is hereby corrected as shown below:

Col. 1, line 41, "PTi" s/b --$PT_i$--

Col. 2, lines 9 and 10, delete "as they are".

Col. 3, line 10, "FIGS. 7A - 7C" s/b --FIGS. 7(A) - 7(C)--:
line 19, "FIGS. 11A - 11C" s/b --FIGS. 11(A) - 11(C)--.

Col. 4, line 32, equation (2b), "$\Delta Y = F_y \cdot 66\ T$" s/b
$\Delta Y = F_y \cdot \Delta T$--.

Col. 5, line 44, delete "$INf_1$".

Col. 7, line 17, "Eln" s/b --$E_{ln}$--;

Col. 8, line 27, "PTk" s/b -$PT_k$--.

Col. 9, line 3, "11(C)" s/b --FIG. 11(C)--.

Claim 1, col. 12, lines 14 and 15, after "different" insert --offset curve;--.

Signed and Sealed this

Twenty-sixth Day of July, 1988

*Attest:*

DONALD J. QUIGG

*Attesting Officer*       *Commissioner of Patents and Trademarks*